United States Patent Office 3,366,374
Patented Jan. 30, 1968

3,366,374
METHOD AND APPARATUS FOR CONTROL OF ROTARY KILN EXIT GAS CONDITIONS
Theodosios Bay, Lansdale, and Charles W. Ross, Hatboro, Pa., assignors to Leeds & Northrup Company, a corporation of Pennsylvania
Filed Nov. 23, 1965, Ser. No. 509,348
20 Claims. (Cl. 263—32)

ABSTRACT OF THE DISCLOSURE

Both the temperature of the exit gases of a rotary cement kiln and the oxygen concentration in those gases is controlled by varying the speed of the induced draft fan. This control is effected in response to the weighted sum of the deviation of the exit gas temperature from its set point and the deviation of the oxygen concentration of the exit gases from its set point. The weighting of the sum is such that a change in the firing rate of the kiln will cause no change in the induced draft fan speed due to control action. Also, the temperature set point is varied slowly in accordance with the exit temperature itself to allow for a wide fluctuation of the exit gas temperature as long as the fluctuations are not rapid.

Figure 1:
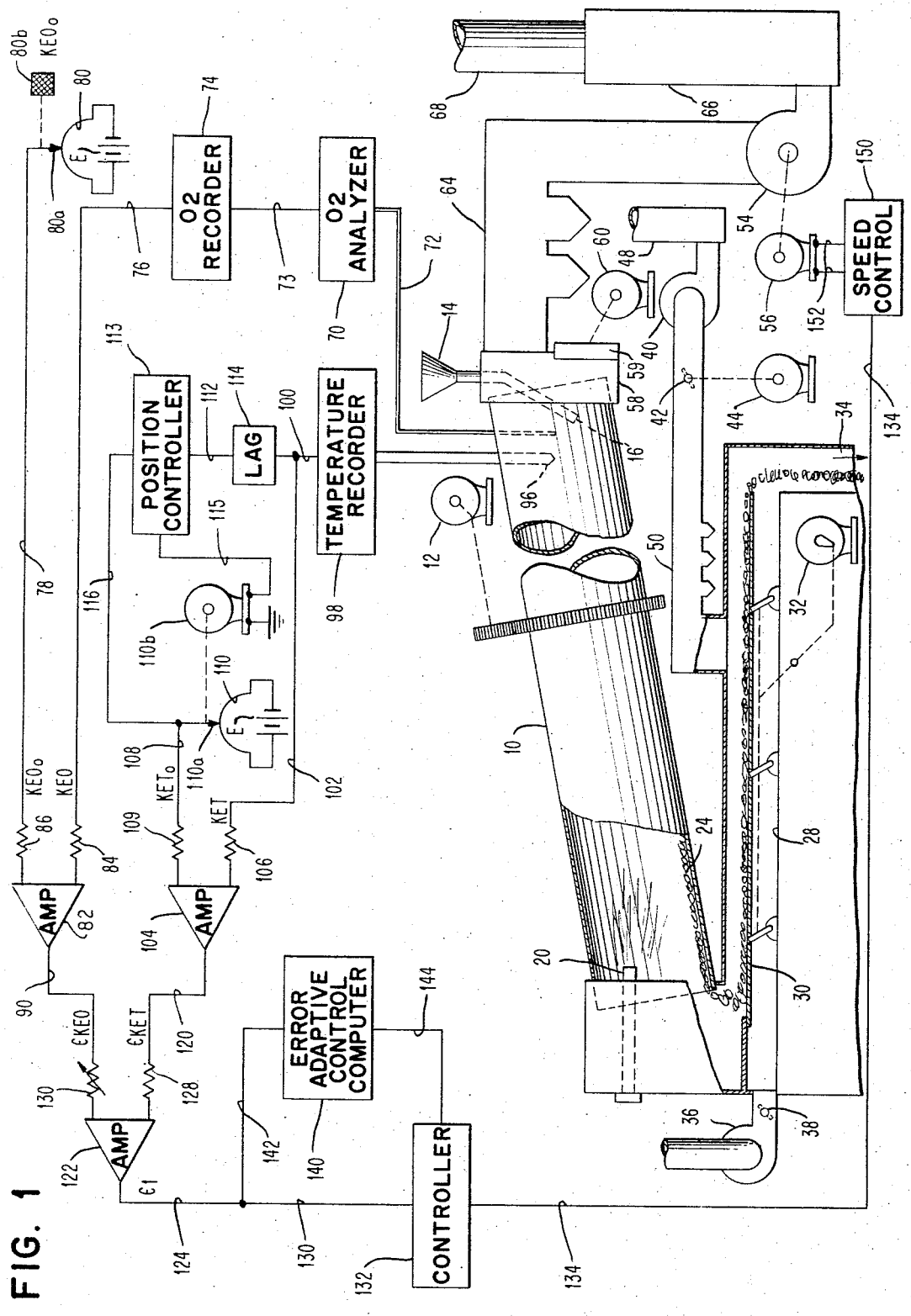

An error adaptive control computer is used so that variations of the induced draft fan speed are produced only when the weighted sum of the deviations exceeds a predetermined magnitude for a predetermined time period to avoid unnecessary control action.

---

This invention relates to a method and means for effecting an improved control of the conditions of the exit of a rotary cement kiln. More particularly, this invention relates to a control system for maintaining simultaneous control over both the oxygen concentration and the temperature at the exit of a kiln, such as a rotary cement kiln.

In the past, control of the exit conditions of a rotary kiln have usually involved the maintenance of control over a single one of the variables at the kiln exit such as temperature, draft, or oxygen in one control loop with other conditions being under control of separate control loops or by means of manual control by the operator. Such control systems have been successful only to a very limited degree or have been unsuccessful in that they have failed to maintain all of the exit conditions at values which allow for an optimum operation of the process. They have also, in some instances, been responsible for the introduction of cyclic disturbances in the process as a result of the interaction between the separate control loops controlling the different exit conditions and maintaining the other process conditions such as burning zone temperature.

It is thus an object of this invention to provide an improved system for controlling the exit conditions of a kiln, particularly a rotary cement kiln.

A further object of this invention is the provision of a control system for maintaining oxygen concentration at the exit of a rotary cement kiln at a value which will closely approach the desired value consistent with the maintenance of control over the temperature at the kiln exit.

A further object of this invention is the provision of a control system for maintaining an optimum condition at the exit of a rotary cement kiln by controlling the air flow through the kiln.

It is likewise an object of this invention to provide a control for the exit conditions of a rotary cement kiln which will not interact adversely with the control of the firing rate of the kiln to maintain desired burning zone temperature.

In accordance with this invention, there is provided a method and means for control of a kiln which in one physical embodiment comprises a means responsive to the deviation of the kiln exit temperature from its set point for the purpose of producing a first error signal, a means which is responsive to the deviation of the oxygen content of the kiln exit gases from an established setpoint for producing a second error signal, other means to establish a composite error signal from the first and the second error signals so that the composite signal is proportional to the weighted sum of the first and the second error signals, and means responsive to the composite error signal which controls air flow through the kiln.

Figure 2:
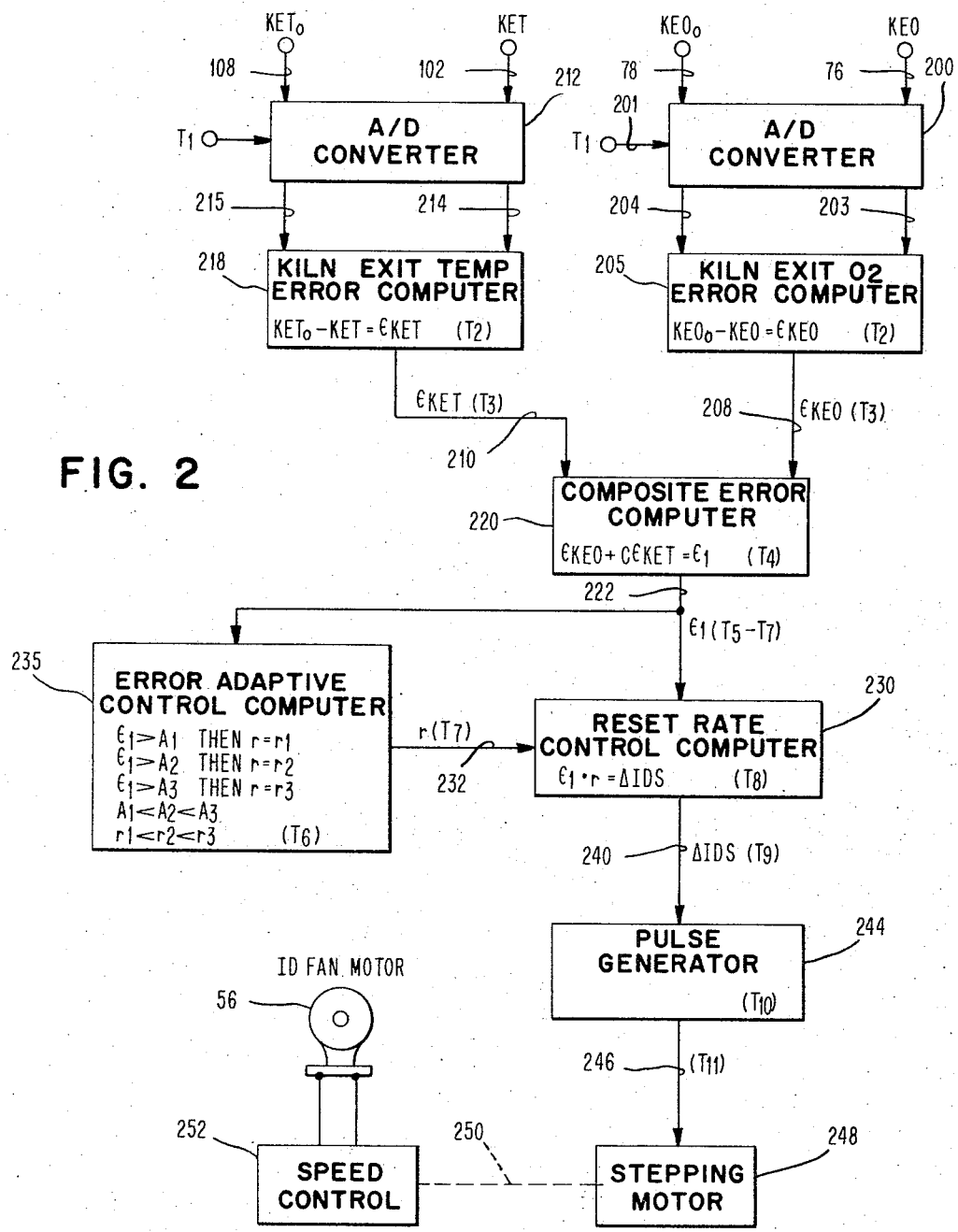

A more detailed understanding of this invention may be had from the following description in conjunction with the drawings in which FIG. 1 is a single-line block diagram of one form of analog circuit showing the novel control system applied to a rotary cement kiln, FIG. 2 is a block diagram showing another form of the novel control system which utilizes digital techniques to carry out the novel method for controlling a rotary cement kiln.

In FIG. 1, the novel control system is shown as it is applied to a typical rotary cement kiln process. This process utilizes a typical rotary kiln 10 which is rotated at a slow speed by motor 12. As the kiln 10, which is tilted at a slight angle to the horizontal, is rotated, feed material is supplied through the funnel-shaped feed device 14 at a rate which will normally be controlled to correspond to the rate at which kiln 10 is rotated. For purposes of simplification, the feed control mechanism is not shown.

The feed material introduced into the funnel-shaped feed device 14 enters the cold end of the kiln 10 through the tube 16 and gradually flows toward the hot end of the kiln as the kiln rotates due to the inclined angle of the kiln. As the feed material travels the length of the kiln in a period which may involve several hours, it is heated by the flames introduced at the lower or hot end of the kiln by burner 20. As the feed material progresses along the kiln length, the temperature of the material is increased, and when the material reaches the lower portion of the kiln, it is in a fused form as clinker, indicated in FIG. 1 by the reference character 24. It is desirable that the clinker be heated to a predetermined temperature before they leave the kiln at its lower end. That temperature is frequently maintained by the control of the rate of fuel feed to burner 20.

A cooling chamber 28 is arranged to receive the clinker 24 as it leaves the hot end of the kiln. The cooling chamber 28 in FIG. 1 is shown as having a shaking grate which is maintained in constant oscillatory action by motor 32. The shaking of grate 30 causes the clinker to travel from the left hand side of the grate toward its right and side in FIG. 1. At that point the clinker which has been cooled falls through a passage 34, the clinker exit, to further processing equipment not shown.

The cooling chamber 28 operates to cool the clinker by the induction of air by cooler fan 36. The amount of cooling air introduced by cooler fan 36 is controlled by damper 38.

The cooling air is forced into the cooling chamber 28 at the under side of the grate and goes up through the grate past the clinker to cool it.

A portion of the air thus heated is then taken from the region above the clinker by the induced draft fan 40 on the cooler chamber. The air flow through fan 40 is subject to control by damper 42 whose position is determined by motor 44 in response to control means not shown . The air drawn by the induced draft fan 40 through its associated stack 48 goes through chamber 50 which includes several banks of cyclone dust collectors for eliminating dust from the gas being exhausted.

That portion of the heated air which is not drawn off by fan 40 is drawn into the kiln 10 at its lower end as air for supporting the combustion of the fuel supplied at burner 20. The major factor determining the amount of draft providing the air flow through the kiln results, however, from the speed at which the induced draft fan 54 is operated by motor 56.

As shown in FIG. 1, the upper exhaust end of kiln 10 leads to the backhouse 58 which includes a tempering fan 59 driven by motor 60 to introduce into the exhaust system cooling air which is effective to reduce the temperature of the exit gases from the kiln so that it will not be excessive. The backhouse 58 includes or is connected with a dust collecting chamber 64 which may include as shown several banks of cyclone dust collectors for the purpose of removing most of the dust from the exit gases. The exit gases are then transported by the induced draft fan into the baghouse 66 and then to the stack 68. The baghouse 66 normally includes a number of bags which are used for the purpose of filtering out the fine dust particles from the exit gases.

In the normal operating procedures, the bags in the baghouse are occasionally caused to be thoroughly emptied or replaced by empty bags. When this occurs, the effect of the induced draft fan will immediately be changed in that the flow of the exit gases will increase by a considerable amount. This factor is one which is accommodated by the novel control, as will be evident from a later description.

As shown in FIG. 1, the novel method of controlling the exit conditions can be conveniently carried out by an analog-type of control system. In FIG. 1, this system includes both temperature measuring equipment and equipment for measuring the oxygen concentration of the kiln exhaust gases.

The oxygen concentration measurement is made by the use of any one of a number of readily available oxygen analyzers, indicated by block 70, which obtains a sample of the exhaust gases from the kiln 10 through sample line 72. The oxygen analyzer 70 then produces on line 73 a signal which is effective to cause the oxygen recorder 74 to record the concentration of oxygen in the exhaust gases from kiln 10 and to produce on retransmitting line 76 a signal which is indicative of the oxygen concentration in the exhaust gases. This quantity may be referred to as KEO. It is desirable that the oxygen concentration of the exhaust gases of the kiln should be maintained as closely as possible to a predetermined desired set point value $KEO_0$. This set point value is established as a signal on line 78 by the adjustment of knob 80b which serves to position the contact 80a on slidewire 80, the slidewire 80 being supplied by a D-C potential from source E.

The signals on lines 76 and 78 are compared by operational amplifier 82. The signals on lines 76 and 78 are supplied to operational amplifier 82 through input resistors 84 and 86, respectively. There is then produced as an output from operational amplifier 82 on line 90 a signal $\epsilon_{KEO}$ which is an error signal representing the deviation of the oxygen concentration in the exit gases of the kiln from its desired value or set point.

The temperature of the exit gases in the kiln is measured by thermocouple 96 which provides an input to temperature recorder 98 so that the temperature may be recorded for guidance of the operator. The temperature recorder 98 provides a retransmitted signal on line 100 representative of the kiln exit temperature as measured by the thermocouple 96. This temperature signal is represented by symbol KET.

The line 100 is connected to line 102 which introduces the signal KET into operational amplifier 104 by way of input resistor 106. At operational amplifier 104 signal KET is compared with the temperature set point $KET_0$, which is introduced on line 108 through input resistor 109 to operational amplifier 104. The temperature set point $KET_0$ is developed as a voltage by the positioning of contact 110a which is positioned by motor 110b on the slidewire 110. The slidewire 110 is supplied by D-C potential E.

While control systems usually utilize a fixed, or at least a relatively fixed setpoint value, it has been found desirable for the control of the exhaust conditions of a rotary cement kiln to provide for variation of the kiln exit temperature setpoint $KET_0$ in accordance with the variation of the exit temperature itself. In essence, this variation allows the current exit temperature to be varied slowly depending upon process conditions. However, by virtue of the control exercised by the system here described, wide fluctuations of the temperature setpoint are permitted. To effect such a floating type of setpoint adjustments, motor 110b positions contact 110a in accordance with a signal supplied on line 112 which is derived from the signal KET on line 100 through a finite time or weighted averaging circuit here shown as a first order lag circuit 114. The positioning is accomplished by position controller 113 which provides a motor energization signal on line 115 and receives a feedback signal from line 108 by way of line 116. Thus the set point $KET_0$ tends to follow the temperature with the lag as introduced in circuit 114.

The operational amplifier 104 compares KET and $KET_0$ and provides as a result a signal $\epsilon_{KET}$ on line 120 which is indicative of the deviation of the kiln exit temperature from its set point. It is desirable in accordance with this novel control system to effect a control of the speed of the induced draft fan 54 in response to the sum of the weighted deviations of the kiln exit oxygen and the kiln exit temperature from their respective set points. For the purpose of this description the term "weighed sum of the deviations" will be used to include the weighting of either or both of the deviations. The weighing being the same or different, as necessary. To effect such a control, it is necessary to establish as an output from operational amplifier 122, a signal on line 124 which is a composite error signal $\epsilon_1$, which responds to weighted sum of $\epsilon_{KEO}$ and $\epsilon_{KET}$. The weighted sum is derived by introducing the signal $\epsilon_{KET}$ through fixed input resistor 128 into operational amplifier 122, while the error signal $\epsilon_{KEO}$ is introduced through a variable input resistor 130 which may be adjusted to have a particular relationship with the resistance of resistor 128. In accordance with the relative magnitudes of the resistors 128 and 130 a weighting factor is determined.

It has been found desirable to control the kiln exit conditions in such a way there is no control effect, that is, no change in induced draft fan speed whenever there is only a change in the firing rate established by the control of fuel feed to burner 20 for maintenance of a desired clinker temperature of the hot end of the kiln. Thus one may make the control of the kiln exit conditions insensitive to a change in fuel rate such as might occur in control of the clinker temperature, by establishing a weighting factor through adjustment of resistor 130 in accordance with empirical determinations of the variations of the kiln exit temperature and the kiln exit oxygen concentration normally resulting from changes in the firing rate of burner 20. In other words, as the firing rate of burner 20 is changed, as for example increased, it is desirable that the resulting increased temperature detected by thermocouple 96 cause a change in the signal $\epsilon_{KET}$ whose effect on the signal $\epsilon_1$ will be exactly equal and opposite the effect of a change in the signal $\epsilon_{KEO}$ resulting from the decreased oxygen concentration in the exit gases produced by the increased firing rate.

In applications in which the dynamics of the measured temperature and oxygen differ appreciably, it may be necessary to introduce compensating dynamics in lines 90 and 120 as by the introduction of matching networks which may be models including deadtime circuits and/or lag circuits. Introducing these circuits can serve to give the desired control action while reducing unnecessary control.

The composite error signal $\epsilon_1$ is introduced by way of line 130 as an input error signal to controller 132 which may be a DIAT controller such as disclosed in U.S. Patent No. 3,008,072. The controller 132 then serves to produce on its output line 134 a control signal related to the input signal appearing on line 130 in accordance with the functions of controller 132.

It is desirable in a process controller of the type here described to prevent or avoid excessive control action particularly where those control actions are not of the type which can be effective to significantly reduce the deviations of the controlled variable. There is therefore introduced into the control system of FIG. 1 an Error Adaptive Control Computer 140 which has an input composite error signal $\epsilon_1$ introduced on line 142. The function of the Error Adaptive Control Computer is to determine the control action desired for the controller 132. This is accomplished by modifying the parameters of controller 132 by the signals on line 144.

It is, for example, desirable that the Error Adaptive Control Computer should provide lower reset rates for deviations $\epsilon_1$ which are of a smaller magnitude and greater reset rates for those composite error signals $\epsilon_1$ which are of greater magnitude. It is also desirable in some cases to take into account not only the magnitude of the composite error signal $\epsilon_1$ but also the period during which that error signal exceeds a predetermined value. A more detailed explanation of one form of an Error Adaptive Control Computer 140 may be had by reference to copending application Ser. No. 399,216, filed Sept. 25, 1964, or the corresponding British Patent 1,061,348 published Mar. 8, 1967.

The signal on line 134 is introduced as an input to a speed control 150 which is effective by virtue of its connection through lines 152 to motor 56 to control the speed of motor 56. The speed control 150 may be any of a number of well-known speed control circuits such as a motor positioned rheostat. The form of the circuit of course would depend to a great extent upon the type of motor which is utilized for motor 56 as a drive for the induced draft fan 54.

The functioning of the control system of FIG. 1 under typical conditions which exist in the operation of rotary cement kilns of the type here illustrated can be better understood by considering a few examples of the manner in which the control serves to maintain the exit conditions of the kiln at values close to those desired for optimum operation of the kiln without any adverse effect on the process.

One example showing the manner in which the control system of FIG. 1 responds to a change in the fuel feed rate has been previously described. It was shown how the change in fuel feed rate caused a decrease in the kiln exit oxygen concentration which was accompanied by an increase in the kiln exit temperature. These changes were described as being of such a magnitude that the respective error signals $\epsilon_{KEO}$ and $\epsilon_{KET}$ with the weighting factor introduced by the adjustable resistor 130 caused the error signal $\epsilon_1$ to remain constant.

Another condition to which the control system of FIG. 1 must respond is sudden changes in air flow. When such a change is an increase in air flow the kiln exit oxygen concentration tends to increase rapidly as does the kiln exit temperature. The result is that $\epsilon_{KEO}$ and $\epsilon_{KET}$ both change in the same direction and there is a substantial increase in $\epsilon_1$ as a result. The control response by controller 132 and speed control 150 to the change in $\epsilon_1$ will cause a fast change in the air flow by a fast adjustment of the speed of I.D. fan 54.

If the air flow change is a sustained change, the kiln exit temperature setpoint $KET_o$ introduced on line 108 will gradually increase until it equals the kiln exit temperature KET represented by the signal on line 102 at which time the control system is effective to maintain the signal $KEO = KEO_o$ so that $\epsilon_{KEO}$ is zero.

An example of some of the conditions under which a change in air flow will be experienced in a rotary cement kiln plant are situations such as baghouse dumping and ring breaks. In both of these cases, there is a sudden and sometimes unexpected large change in the air flow through the kiln and a quick response by the control system is required to maintain stable operating conditions in the system. As explained above, the control system of FIG. 1 provides this quick response and the control system operates to provide the necessary control actions to accommodate sustained air flow changes.

Under still other conditions the kiln rotation speed will be changed, as for example when the speed of the induced draft fan 54 reaches a high limit so that no more control in the direction of an increased air flow is possible from an adjustment of fan speed. Under such a condition, a decrease in kiln speed may be affected as by manual control or by a control loop other than that shown in FIG. 1.

It will be evident that a decrease in kiln speed will result in the material flowing through the kiln being maintained in the kiln for a longer period of time. This will ultimately result in an increase in the kiln exit temperature even though the temperature of the clinker 24 in the burning zone are maintained at a desired value by controls not shown. Over a period of time, signal $KET_o$ on line 108 will approach KET on line 102 by virtue of the operation of the averaging circuit shown as a lag 114, thus establishing a new kiln exit temperature setpoint. Induced draft fan 54 will be adjusted so that it will ultimately cause the kiln exit oxygen concentration to come to its setpoint, thus reducing the error signal $\epsilon_{KEO}$ to zero. These changes which have been described as resulting from a change in the kiln speed will tend to be slow changes in comparison to those previously described as resulting from a change in air flow.

From the above examples, it will be evident that the control system in FIG. 1 is effective to maintain the desired exit conditions in the kiln regardless of the nature or source of disturbances to which the process is subjected.

The control system of FIG. 1 can be conveniently carried out by use of digital equipment coupled in the manner shown in FIG. 2. In FIG. 2 the oxygen concentration at the kiln exit KEO and the corresponding set point $KEO_o$ are shown as being signals which are respectively introduced on lines 76 and 78 which correspond respectively to like numbered lines in FIG. 1. These signals are converted during the time period $T_1$ by the analog-to-digital converter 200 in response to the timing signal introduced on line 201. The resulting digital signals representing the signals KEO and $KEO_o$ are then supplied on lines 203 and 204 respectively to the kiln Exit Oxygen Error Computer 205 which is a digital computer designed for solving the equation $$KEO_o - KEO = \epsilon_{KEO}$$

during the time period $T_2$ which follows the time period $T_1$. It will be evident to those familiar with digital computers that any one of a number of available digital computers could be utilized for the solution of the simple equation shown above so as to produce on output line 208 during the period $T_3$ the error signal $\epsilon_{KEO}$ in digital form.

The error signal $\epsilon_{KET}$ is produced on line 210 during the period $T_3$ in a manner quite similar to that described above for the production of the error signal $\epsilon_{KEO}$. Thus the signals KET and $KET_o$ in analog form are supplied from lines 102 and 108, respectively, and these signals are converted by the analog-to-digital converter 212 during the period $T_1$ to digital signals which then appear on the lines 214 and 215, respectively, as inputs to the Kiln Exit Temperature Error Computer 218. In the Kiln Exit Temperature Error Computer, the input signals in digital form are utilized to compute the following equation:

$$KET_o - KET = \epsilon_{KET}$$

This computation is carried out during the time period $T_2$ so that the computer 218 is able to produce an output $\epsilon_{KET}$ during the period $T_3$ on line 210.

Lines 208 and 210 provide the input signals for the Composite Error Computer 220 which serves to execute in a digital form a computation in accordance with the equation $$\epsilon_{KEO} + C\epsilon_{KET} = \epsilon_1$$

where C is the same weighting constant established by the adjustment of resistor 130 in the analog control circuit of FIG. 1.

The computation carried on by computer 220 is effected during the period $T_4$ so as to produce on its output line 222 during the periods $T_5 - T_7$ the composite error signal $\epsilon_1$. The composite error signal is then introduced as an input to the Reset Rate Control Computer which receives not only an input from line 222 but also an input from line 232, the latter input being representative of the desired reset rate. Thus the computer 230 is operative to compute the change in I.D. fan speed, $\Delta IDS$, in accordance with the following equation:

$$\epsilon_1 \cdot r = \Delta IDS$$

the computation being carried out during time $T_8$. It is assumed that the control execution utilizes a reset function only. It is obvious that other functions such as proportional and rate action can be incorporated if desired.

As shown in FIG. 2, the Error Adaptive Control Computer 235 receives as its input signal a signal from line 222 representative of the composite error signal $\epsilon_1$.

The Error Adaptive Control Computer operates to compare the composite error signal $\epsilon_1$ with a plurality of set values $A_1$, $A_2$ and $A_3$. When $\epsilon_1$ is greater than the preset value $A_1$, then there is produced on the output line 232 a signal in digital form representing a reset rate $r_1$. If $\epsilon_1$ is greater than $A_2$ then the signal on line 232 is equal to $r_2$, which is greater than $r_1$. In similar manner, if the Error Adaptive Control Computer by comparing $\epsilon_1$ with the preset value $A_3$ determines that $\epsilon_1$ is greater than $A_3$ the signal on line 232 is a value $r_3$, greater than $r_2$. Thus the Error Adaptive Control Computer establishes on its output line 232 a signal which may be any one of three different values depending upon the magnitude of the composite error signal $\epsilon_1$. As previously mentioned, the Error Adaptive Control Computer could include the time factor in its determination of the proper reset rate. However, for the sake of simplicity, the determinations here described are limited to the magnitude only of the composite error signal.

As indicated, the computations in the computer 235 are carried out during the period $T_6$ so as to present the rest rate signal on line 232 during period $T_7$ so that the Rest Rate Control Computer 230 can complete its computation during the period $T_8$, and provide its out $\Delta IDS$ on the output line 240 during the period $T_9$.

The signal on line 240 indicative of the change in I.D. fan speed, that is the change in the speed of fan 54 (FIG. 1), provides an input signal to the pulse generator 244 which during the period $T_{10}$ establishes a train of pulses in number proportional to the magnitude of the digital signal appearing on line 240 during the period $T_9$. This train of pulses, each of which may have the same duration, is then supplied on output line 246 to stepping motor 248. The series of pulses will then be effective to cause the stepping motor 248 to take a number of predetermined steps corresponding to the number of pulses supplied on line 246. Each of these steps is effective to produce a corresponding rotation of shaft 250 to change the speed of the I.D. fan motor 56 by changing the input of the speed control 252. In this particular circuit, the speed control 252 might, for example, consist of a rheostat or some other form of control which is capable of modifying the speed of the motor. The particular form of speed control which might be advantageously utilized will depend, of course, on the type of the motor 56 which is used to drive the I.D. fan.

In FIG. 2, each of the several computers 205, 218, 220, 230, and 235 may be a special purpose computer designed particularly to carry out the single computation which it is called upon to execute. It will be evident that the same series of computations may be advantageously carried out by a general purpose computer programmed so as to time share the computing elements of the computer so as to produce a signal $\Delta IDS$ in much the same way as it is produced on the output line 240 in FIG. 2. The special purpose computers or general purpose computers which can be utilized to carry out these computations are well-known in the art and are therefore not described in detail. Likewise, pulse generators of the type which would be capable of performing the function described for the pulse generator 244 of FIG. 2 are known in the art and are readily available, as are the stepping motors and speed controls 248 and 252, respectively.

What is claimed is:
1. A control system for controlling the exit conditions of a rotary kiln by modifying the kiln exit draft comprising
   means for producing a first signal indicative of the exit temperature of said kiln,
   means for producing a second signal indicative of the setpoint for said kiln exit temperature,
   means for producing a third signal indicative of the oxygen concentration in the gases at the kiln exit,
   means for producing a fourth signal indicative of a setpoint for said oxygen concentration in the gases at said kiln exit,
   means for establishing a composite error signal from said first, second, third and fourth signals so that said composite error signal is proportional to the weighted sum of the respective deviations between said first and second signal and said third and fourth signal, and
   means responsive to said composite error signal for controlling said kiln exit draft.

2. A control system as set forth in claim 1 in which said means responsive to said composite error includes a controller having at least a reset control function for effecting a change in said kiln exit draft in accordance with the time integral of said composite error.

3. A control system as set forth in claim 1 in which said means responsive to said composite error includes a controller having at least a reset function for effecting a change in the kiln exit draft in accordance with the time integral of said composite error and an error adaptive filtering circuit responsive to said composite error signal and operable to change the integration rate of said reset function in accordance with the relative values of said composite error signal and a preset value for said composite error signal.

4. A control system as set forth in claim 1 in which said second signal is continually modified in response to a signal representing an average value for said first signal.

5. A control system for controlling two process conditions by modifying a single variable of the process comprising
   means for establishing a signal indicative of the value of a first of said conditions,
   means for establishing a signal indicative of the desired value for said first condition,
   means for establishing a signal indicative of the value of a second of said process conditions,
   means for establishing a signal indicative of the desired value of said second process condition,
   means for controlling said single variable in response to the weighted sum of the deviation of said first condition from its desired value and the deviation of said second condition from its desired value, and means responsive to the value of one of said process conditions for changing at a relatively slow rate the signal representative of the desired value of that condition, said change being such as to tend to bring said changed desired value to equality with said value of said one condition.

6. A control system for controlling a process condition comprising means responsive to the actual value of said process condition to produce a signal indicative of the magnitude of said condition, means responsive to the deviation of said signal from a signal representing the desired value of said condition for controlling a variable of said process so as to tend to return said process condition to its desired value, and means for modifying said desired value signal in response to a lagged signal derived from said signal representing said actual process condition so that said desired value signal approaches equality with said first mentioned signal.

7. A control system for controlling the exit conditions of a rotary cement kiln by modifying the kiln exit draft comprising means responsive to the deviation of the kiln exit temperature from its setpoint for producing a first error signal in accordance therewith, means responsive to the deviation of the oxygen content of the kiln exit gases from an established set point for producing a second error signal in accordance therewith, means for establishing a composite error signal from said first and second error signals so that said composite error signal is proportional to the weighted sum of said first and second error signals, and means responsive to said composite error signal for controlling said kiln exit draft.

8. A control system as set forth in claim 7 in which said means responsive to said composite error includes an integral control for effecting a change in kiln exit draft in accordance with the time integral of said composite error.

9. A control system as set forth in claim 7 in which said means responsive to said composite error includes an integral control for effecting a change in the kiln exit draft in accordance with the time integral of said composite error and an error adaptive filter circuit responsive to said composite error signal and operable to change the integration rate of said integral controller in accordance with the value of a characteristic of said composite error signal.

10. A control system as set forth in claim 7 in which said kiln exit temperature set point is continually modified in accordance with an averaged signal responsive to the measured kiln exit temperature.

11. In control system for maintaining the desired conditions at the exit of a rotary cement kiln, the combination of means for producing a first signal indicative of the desired concentration of oxygen in the gases drawn from the kiln by the induced draft fan, means for producing a second signal indicative of the measured value of said oxygen concentration, means for comparing said first and second signals and producing in response thereto an oxygen error signal, means for producing a third signal indicative of the measured value of the temperature of the gases of said kiln exit, means for producing a fourth signal indicative of the desired temperature of said exit gases, said last named means including means for modifying said fourth signal in accordance with an averaged value of said third signal, means for comparing said third and fourth signals and producing in response thereto a temperature error signal, means for producing a composite error signal in accordance to the weighted sum of said oxygen and said temperature error signals, means responsive to said composite error signal for changing the gas flow from the exit of said kiln at a rate proportional to said composite error signal, and error adaptive computer means operable to change said rate when said composite error signals exceed a predetermined value whereby the rate at which the kiln exit gas flow is changed is varied with the magnitude of said composite error so as to tend to maintain said composite error at zero.

12. A method for controlling the exit conditions of a rotary cement kiln comprising the steps of producing a first signal in accordance with the deviation of the concentration of oxygen in the kiln exit gases from a desired value, producing a second signal in accordance with the deviation of the kiln exit temperature from its desired value, producing a third signal in accordance with a weighted sum of said first and second signals, said third signal being indicative of the change required in the kiln exit draft to provide the desired control of said conditions, and modifying the kiln exit draft in accordance with said third signal.

13. The method as set forth in claim 12 in which the step modifying the kiln exit draft performs the modification in accordance with the time integral of said third signal.

14. A method as set forth in claim 12 in which the step modifying the kiln exit draft performs the modification in accordance with the time integral of said third signal and in which the integrating rate for said time integral is adjusted in accordance with the relative value of said third signal and a preset value for said third signal.

15. A method for controlling the exit conditions of a rotary cement kiln comprising the steps of producing a first signal in accordance with the deviation of the concentration of oxygen in the kiln exit gases from a desired value, producing a second signal in accordance with the deviation of the kiln exit temperature from its desired value, producing a third signal in accordance with a weighted sum of said first and second signals, producing a fourth signal in accordance with the product of said third signal and a factor varied in accordance with the magnitude of said third signal, and modifying the kiln draft in accordance with said fourth signal.

16. The method for producing the desired conditions at the exit of a rotary cement kiln comprising the steps of producing a first signal in accordance with the desired value of the oxygen concentration of the gases at said kiln exit, producing a second signal in accordance with the existing value of the oxygen content of said kiln exit gases, comparing said first and second signal and producing as a result of said comparison a third signal indicative of the deviation of said second signal from the value of said first signal, producing a fourth signal in accordance with the existing value of the temperature of said kiln exit gases, producing a fifth signal in accordance with an averaged function of said fourth signal, said fifth signal being indicative of the desired value for said kiln exit gas temperature, comparing said fourth and fifth signals and producing as a result of said comparison a sixth signal indicative of the deviation of said exit temperature from a desired value for said exit temperature, producing a seventh signal in accordance with a weighted sum of said third and said sixth signals, producing an eighth signal in accordance with the relative magnitude of said seventh signal and a predetermined constant, said eighth being increased when said seventh signal exceeds said constant, producing a ninth signal in accordance with the product of said seventh and eighth signals, and modifying the kiln exit draft in accordance with said ninth signal.

17. A method for producing the desired conditions at the exit of a rotary cement kiln comprising the steps of producing a first signal in accordance with the desired value of the oxygen concentration of the gases at said kiln exit, producing a second signal in accordance with the existing value of the oxygen concentration of said kiln exit gases, producing a third signal in accordance with the existing value of temperature of said kiln exit gases, producing a fourth signal in accordance with an averaged function of said third signal, said fourth signal being indicative of the desired value for said kiln exit gas temperature, producing a fifth signal in accordance with the weighted sum of the difference between said first and second signal and the difference between said third and fourth signal, producing a sixth signal in accordance with the relative magnitude of said fifth signal and a predetermined constant, said sixth signal being increased when said fifth signal exceeds said constant, producing a seventh signal in accordance with the product of said fifth and sixth signals, and modifying the kiln exit draft in accordance with said seventh signal.

18. A method as set forth in claim 17 in which said step modifying the kiln exit draft performs the modification in accordance with the time signal of said seventh signal.

19. A method for controlling two process conditions by modifying a single variable of a process comprising the steps of producing a signal indicative of the existing value of a first of said conditions, producing a signal indicative of the desired value for said first condition, producing a signal indicative of the existing value of a second of said process conditions, producing a signal indicative of the desired value of said second of said process conditions, controlling said single variable in accordance with the weighted sum of the deviation of said first condition from its desired value and the deviation of said second condition from its desired value, and changing at a relatively slow rate the signal representative of the desired value of one of said process conditions in response to the value of said one of said process conditions, said change being such as to tend to bring said changed desired value to equality with said value of said one of said conditions.

20. A method for controlling a process condition comprising the steps of producing a signal indicative of the magnitude of the actual value of said process condition, controlling a variable of said process in response to the deviation of said signal indicative of the magnitude of said condition from a signal representing the desired value, and modifying said desired value signal in response to a lagged signal derived from said signal representing said actual process condition so that said desired value signal approaches equality with said indicative of the magnitude of said condition.

References Cited

UNITED STATES PATENTS

| | | | |
|---|---|---|---|
| 2,298,257 | 10/1942 | Reaser et al. | 236—15 |
| 2,666,584 | 1/1954 | Kliever | 236—15 |
| 3,202,800 | 8/1965 | Phillips et al. | 236—15 |
| 3,252,693 | 5/1966 | Nelson | 236 |

FREDERICK L. MATTESON, JR., *Primary Examiner.*

JOHN J. CAMBY, *Examiner.*

UNITED STATES PATENT OFFICE
CERTIFICATE OF CORRECTION

Patent No. 3,366,374                            January 30, 1968

Theodosios Bay et al.

It is hereby certified that error appears in the above numbered patent requiring correction and that the said Letters Patent should read as corrected below.

Column 1, line 46, for "unsucessful" read -- unsuccessful --; column 2, line 54, for "and" read -- hand --; column 4, line 34, for "weighed" read -- weighted --; line 36, for "weighing" read -- weighting --; line 50, after "way" insert -- that --; line 54, for "of", first occurrence, read -- at --; column 5, line 16, after "input" insert -- the --; column 7, line 56, for "rest" read -- reset --; line 57, for "Rest" read -- Reset --; line 58, for "out" read -- output --; column 10, line 28, after "said" insert -- exit --; column 11, line 43, for "signal", first occurrence, read -- integral --; column 12, line 32, after "said" insert -- signal --.

Signed and sealed this 1st day of April 1969.

(SEAL)
Attest:

EDWARD M.FLETCHER,JR.                      EDWARD J. BRENNER
Attesting Officer                          Commissioner of Patents